(12) United States Patent
Mori

(10) Patent No.: US 7,487,027 B2
(45) Date of Patent: Feb. 3, 2009

(54) AUTOMATIC TRANSMISSION AND A HYDRAULIC PRESSURE CONTROLLING DEVICE FOR AN AUTOMATIC TRANSMISSION

(75) Inventor: Masanori Mori, Kariya (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 436 days.

(21) Appl. No.: 10/948,456

(22) Filed: Sep. 24, 2004

(65) Prior Publication Data

US 2005/0071069 A1 Mar. 31, 2005

(30) Foreign Application Priority Data

Sep. 26, 2003 (JP) .............................. 2003-334929

(51) Int. Cl.
*B60K 17/00* (2006.01)
(52) U.S. Cl. .................... 701/54; 477/156; 477/176; 74/336 R
(58) Field of Classification Search ................ 701/54, 701/59; 477/156, 119, 176, 121, 124; 475/127, 475/120; 74/336 R, 335; B60K 17/00
See application file for complete search history.

(56) References Cited

U.S. PATENT DOCUMENTS

| | | | | |
|---|---|---|---|---|
| 5,517,411 | A * | 5/1996 | Genise et al. ................ | 701/53 |
| 5,582,558 | A * | 12/1996 | Palmeri et al. ............... | 477/109 |
| 5,735,771 | A * | 4/1998 | Genise ........................ | 477/111 |
| 5,749,802 | A * | 5/1998 | Tanahashi et al. ........... | 475/120 |
| 5,755,639 | A * | 5/1998 | Genise et al. ................ | 477/111 |
| 5,989,155 | A * | 11/1999 | Wadas et al. ................. | 477/111 |
| 6,164,149 | A * | 12/2000 | Ohmori et al. .............. | 74/336 R |
| 6,259,983 | B1 | 7/2001 | Tsutsui et al. | |
| 6,793,602 | B2 * | 9/2004 | Kaigawa et al. ............. | 475/123 |
| 6,885,928 | B2 * | 4/2005 | Berglund et al. ............. | 701/51 |
| 6,893,379 | B2 * | 5/2005 | Sakamoto et al. ........... | 477/156 |
| 6,929,584 | B2 * | 8/2005 | Miyata et al. ................ | 477/119 |
| 6,979,275 | B2 * | 12/2005 | Hiraku et al. ................ | 475/214 |
| 2003/0027685 | A1* | 2/2003 | Watanabe et al. ........... | 477/107 |
| 2003/0125161 | A1* | 7/2003 | Tokura et al. ................ | 477/176 |

FOREIGN PATENT DOCUMENTS

JP 10-299879 A 11/1998
JP 11-63202 A 3/1999

(Continued)

*Primary Examiner*—Tuan C To
(74) *Attorney, Agent, or Firm*—Buchanan Ingersoll & Rooney PC

(57) ABSTRACT

A hydraulic pressure controlling device for an automatic transmission controlling a plurality of friction engaging elements to be engaged and disengaged by controlling a hydraulic pressure comprises a shift lever operation detecting means, an input rotation detecting means for monitoring an input shaft rotation number, a shift start time period calculating means for judging that an engagement of each friction engaging element is started when the input shaft rotation number is decreased at a predetermined rotation number and calculating a shift start time period, an input rotation change rate detecting means for calculating an input shaft rotation change rate when the input shaft rotation number is decreased by a predetermined rotation number, and a correcting and leaning-setting means for correcting a pre-charge time and a standby pressure based on the shift start time period and the input rotation change rate, and leaning-setting the pre-charge time in preference to the standby pressure.

3 Claims, 6 Drawing Sheets

FOREIGN PATENT DOCUMENTS

| | | |
|---|---|---|
| JP | 2000-002324 | 1/2000 |
| JP | 3055346 | 4/2000 |
| JP | 2000-145939 A | 5/2000 |
| JP | 2003-130204 A | 5/2003 |
| JP | 2003-130205 A | 5/2003 |

* cited by examiner

AUTOMATIC TRANSMISSION AND A HYDRAULIC PRESSURE CONTROLLING DEVICE FOR AN AUTOMATIC TRANSMISSION

CROSS REFERENCE TO RELATED APPLICATIONS

This application is based on and claims priority under 35 U.S.C. § 119 to Japanese Patent Application 2003-334929, filed on Sep. 26, 2003, the entire content of which is incorporated herein by reference.

FIELD OF THE INVENTION

This invention generally relates to an automatic transmission and a hydraulic pressure controlling device for an automatic transmission. More particularly, the present invention pertains to an automatic transmission and a hydraulic pressure controlling device for an automatic transmission including a method for controlling hydraulic pressure provided to a plurality of friction engaging elements by directly controlling the hydraulic pressure provided from the hydraulic pressure source with an electromagnetic valve.

BACKGROUND

According to the known automatic transmission, when a shift lever of an automatic transmission is switched from a non-running range to a running range, a known garage controlling for transmitting a clutch of the automatic transmission to be in a running condition is executed. An engine rotation when such garage controlling is executed is usually equivalent to an idling rotation, and input torque is usually small, however; a setting range for a controlling hydraulic pressure is set to be large in consideration of a case that the input torque becomes large when an engine starts under a cold atmosphere. Thus, accuracy of the hydraulic pressure within the low pressure range which is often used is reduced, and fluctuation of the vehicle behavior such as a shift shock and a time-lag occurrence until a vehicle stars traveling are marked.

Setting a target time when the shift shock and the time-lag occurrence become compatible, a known learning control is executed by changing the hydraulic pressure up and down so as to make a time from the garage control starting time to the shift starting time or transmission ending time (transmission time period) to be the target time. For example, a known method disclosed in JP3055346B1 corrects a tightening operating fluid up and down in response to a length of a tightening required time relative to a setting time.

To abolish an accumulator and downsize a parts number, cost and size, an automatic transmission includes an electromagnetic valve for producing a clutch pressure by directly controlling a hydraulic pressure from a source of the hydraulic pressure. Such automatic transmission applies a high pressure charge during a predetermined time in an allowance area at the front portion of a piston stroke, and then executes a standby controlling for standing ready at low hydraulic pressure for moving a clutch piston (piston) rapidly.

A pre-charge pressure and a pre-charge time for a pre-charge controlling, and a standby pressure for standby pressure controlling are called as hydraulic pressure characteristic values. Thus, to change the transmission time period, such hydraulic pressure characteristic values related to the pre-charge control need to be considered as controlling factors at least as well as the controlling the hydraulic pressure up and down.

Further, considering a wear of the clutch or an various environments where the transmission is provided, the known means without the considering the hydraulic characteristic values related to the pre-charge control has a limitation to converge the transmission time period to a target time period. Specifically, the known automatic transmission includes a hard structure comprising a combination of the accumulator and an orifice, and such hard structure is applicable to a transmission which is having an function to adjust a clutch pressure increasing speed depending on a level of the provided hydraulic pressure, and not applicable to a transmission having a means for forming the clutch pressure by directly controlling the hydraulic pressure provided from the hydraulic pressure source by means of a electromagnetic valve.

FIG. 6A illustrates graphs indicating results of the starting control with a new friction engaging element C1. FIG. 6B illustrates graphs indicating results of the starting control with an aged friction engaging element C1 (0.4 mm/piece). A shift start time period T in FIG. 6B is longer than a shift start time period T in FIG. 6A. In addition, a time lag is found in FIG. 6B. Further, each torque in FIG. 6B has a sharp inclination, so that a transmission shock may be occurred under such condition. Thus, the leaning controlling needs to be executed.

Thus, a need exists for a hydraulic pressure controlling device of an automatic transmission or an automatic transmission using a method for forming a clutch pressure by directly controlling a hydraulic pressure provided from a source of the hydraulic pressure using an electromagnetic valve.

SUMMARY OF THE INVENTION

According to an aspect of the present invention, a hydraulic pressure controlling device for an automatic transmission controlling a plurality of friction engaging elements to be engaged and disengaged by controlling a hydraulic pressure provided from the hydraulic pressure controlling device for forming a plurality of shift stages by combination of the engagement and the disengagement of the friction engaging elements comprises a shift lever operation detecting means, an input rotation detecting means for monitoring an input shaft rotation number, a shift start time period calculating means for judging that an engagement of each friction engaging element is started when the input shaft rotation number is decreased at a predetermined rotation number and calculating a shift start time period from a predetermined shift start determining reference time to a time when the engagement is started, an input rotation change rate detecting means for calculating an input shaft rotation change rate when the input shaft rotation number is decreased by a predetermined rotation number after the engagement is started, and a correcting and leaning-setting means for correcting a pre-charge time and a standby pressure based on the shift start time period calculated by the shift start time period calculating means and the input rotation change rate calculated by the input rotation change rate detecting means, and leaning-setting the pre-charge time in preference to the standby pressure.

According to another aspect of the present invention, a hydraulic pressure controlling device for an automatic transmission controlling a plurality of friction engaging elements to be engaged and disengaged by controlling a hydraulic pressure provided from the hydraulic pressure controlling device for forming a plurality of shift stages by combination of the engagement and the disengagement of the friction engaging elements comprises a shift lever operation detecting means, an input rotation detecting means for monitoring an input shaft rotation number, a shift start time period calculating means for judging that an engagement of each friction engaging element is started when the input shaft rotation number is decreased at a predetermined rotation number and calculating a shift start time period from a predetermined shift start determining reference time to a time when the engagement is started, an input rotation change rate detecting means for calculating an input shaft rotation change rate when the input shaft rotation number is decreased by a predetermined rotation number after the engagement is started, a first correcting means for correcting a pre-charge time when the shift start time period calculated by the shift start time period calculating means is not within a predetermined target area depending on a difference between the target area and the shift start time period, and leaning-setting the corrected amount, a second correcting means for correcting a standby pressure when the input rotation change rate calculated by the input rotation change rate detecting means is not within a predetermined target area depending on a difference between the target area and the input rotation change rate, and leaning-setting the corrected amount.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Figure 1:
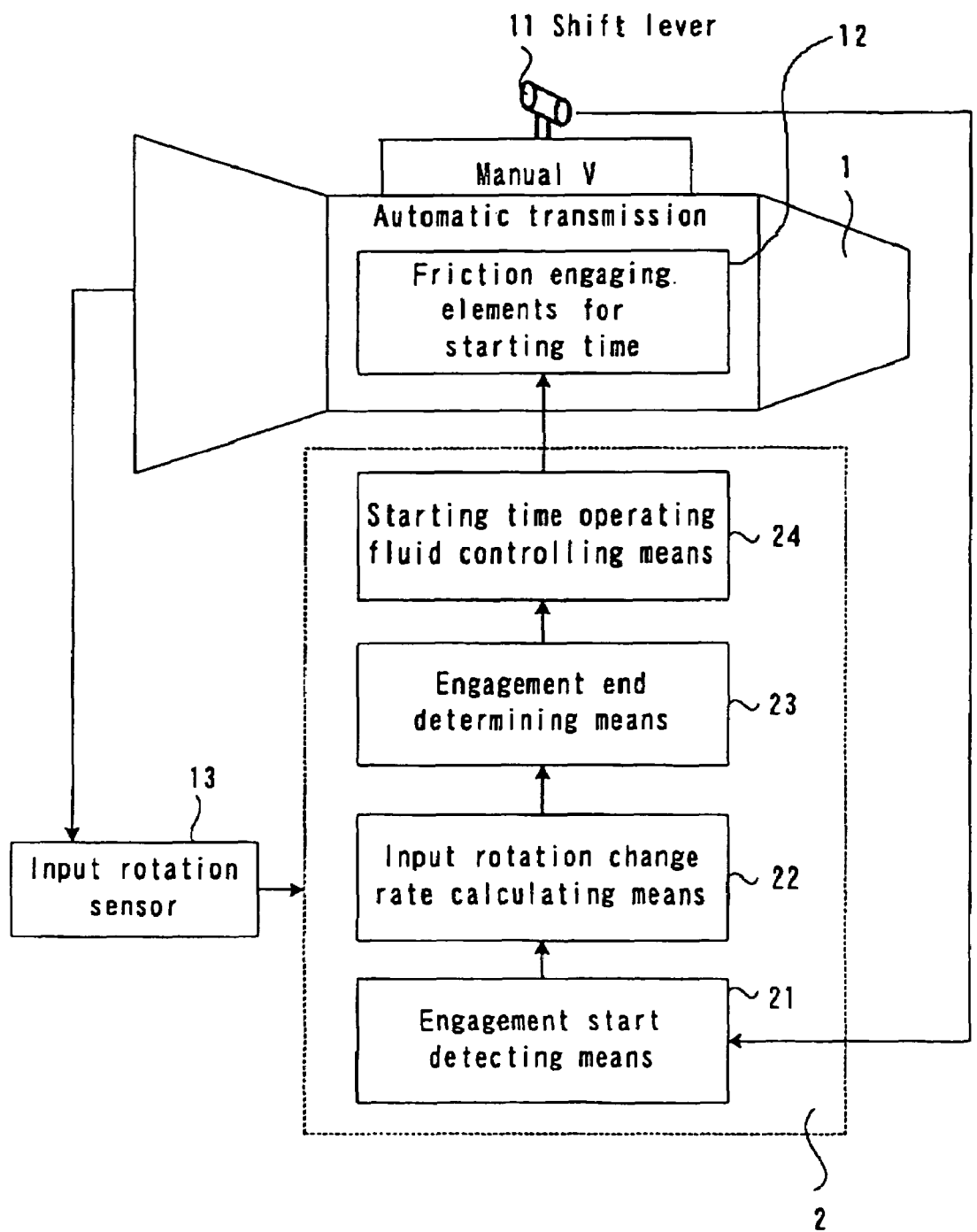
FIG. 1 illustrates a configuration of a hydraulic pressure controlling system of an embodiment of the present invention.

An embodiment of the present invention will be explained hereinbelow referring to attached drawings. FIG. 1 illustrates a configuration of a hydraulic pressure controlling system of an embodiment of the present invention. FIG. 1 illustrates an automatic transmission 1 and a hydraulic pressure controlling device 2. The automatic transmission 1 includes a shift lever 11 (shift operation determining means), a plurality of friction engaging elements for starting time 12 and an input rotation sensor 13. The hydraulic pressure controlling device 2 includes a computer for executing programs comprising an engagement start detecting means (shift start time period calculating means) 21, an input rotating change rate calculating means 22, an engagement end determining means 23 and a starting time operating fluid pressure controlling means 24.

The engagement start detecting means (shift start time period calculating means) 21 including a timer for calculating the shift start time period. Specifically, the engagement start detecting means 21 measures the shift start time period from a point at which the pre-charge control is ended by the starting time operating fluid pressure controlling means 24 to a point at which an input rotation number provided from the input rotation sensor 13 is reduced at a predetermined rotation number $\Delta Nt_1$ relative to an input rotation number $Nt_0$.

The input rotation change rate calculating means 22 includes a timer for calculating an input rotation change rate. Specifically, after the shift starts, the input rotation change rate calculating means 22 starts up the timer at a point where the input rotation number provided from the input rotation sensor 13 is further reduced at a predetermined rotation number $\Delta Nt_2$ and calculates the input rotation change rate by dividing a predetermined rotation reduction width by an unit time.

The engagement end determining means 23 determines an end of the engagement when the following formula is affected.

Input rotation number≦Output shaft rotation number× Gear ratio

Then, the engagement end determining means 23 ends the starting control.

The starting time operating fluid pressure controlling means 24 memorizes and holds hydraulic pressure characteristic values such as a length of the pre-charge time and a standby pressure level (transmission standby pressure level) and controls the hydraulic pressure for engaging the plurality of friction engaging elements for starting time 12 of the automatic transmission 1. At the same time, the starting time operating fluid pressure controlling means 24 corrects the hydraulic characteristic values being memorized and held based on the shift start time period calculated by the engagement start detecting means (shift start time period calculating means) 21 and the input rotation change rate calculated by the input rotation change rate calculating means 22, and leans and sets such hydraulic characteristic value.

Figure 2:
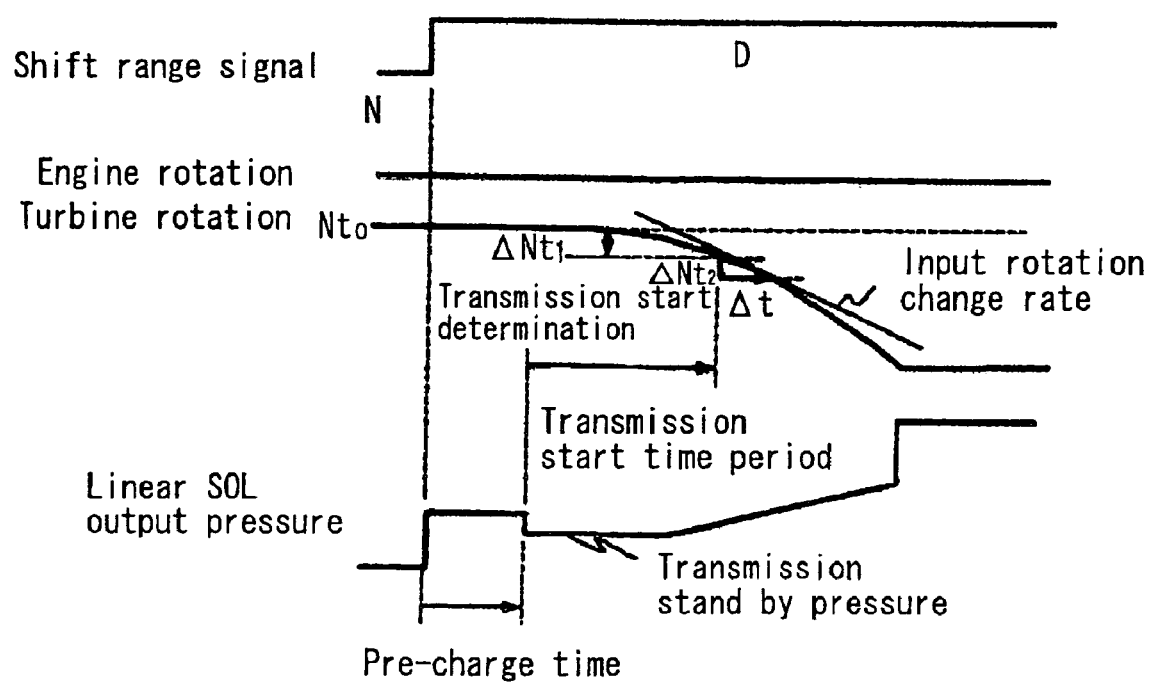
FIG. 2 illustrates a graph for explaining a controlling outline of a hydraulic pressure controlling device of an embodiment of the present invention.

In such configuration, a flow of the process of the correction of the length of the pre-charge time and the standby pressure level (transmission standby pressure level) and the learning-setting for the next starting time will be explained hereinbelow referring to FIG. 2. First, when a shift lever is switched from N to D, the starting time operating fluid pressure controlling means 24 starts the pre-charge control of the hydraulic pressure related to the plurality of friction engaging elements for starting time 12 and the standby pressure control. Then, the starting time operating fluid pressure controlling means 24 executes the pre-charge control for filling up the operating fluid into a piston chamber at a predetermined pre-charge pressure value during a pre-charge time period being memorized and held in advance.

A correcting process of the pre-charge time based on a hydraulic temperature (first correcting process) will be explained hereinbelow. The hydraulic pressure controlling device 2 includes an operating fluid temperature detecting means for detecting the operating fluid temperature and a pre-charge time correcting means (second hydraulic pressure characteristic value correcting means) for correcting the pre-charge time based on the detected temperature (not shown). The starting time operating fluid pressure controlling means 24 obtains the correction results from the pre-charge time correcting means and executes the pre-charge control by increasing/decreasing the pre-charge time, for example, increases/decreases at ±0 msec when the hydraulic temperature is 80 C, increases 50 msec when the hydraulic temperature is 55 C and increases 100 msec when the hydraulic temperature is −30 C.

Once the starting time operating fluid pressure controlling means 24 ends the pre-charge control, the starting time operating fluid pressure controlling means 24 executes the standby hydraulic pressure control based on the standby hydraulic pressure being memorized and held in advance. On the other hand, after the starting time operating fluid pressure controlling means 24 ends the pre-charge control, the engagement start detecting means (shift start time period calculating means) 21 activates the timer for calculating the shift start time period and starts to monitor the input rotation number provided from the input rotation sensor 13. The input rotation number is reduced once the plurality of friction engaging elements for starting time 12 transmit torque, so that the engagement start detecting means (shift start time period calculating means) 21 determines that the transmission has been started when the engagement start detecting means (shift start time period calculating means) 21 detects that the input rotation number is decreased at the predetermined value $\Delta Nt_1$ from the input rotation number $Nt_0$ at the control starting point. Then, the engagement start detecting means (shift start time period calculating means) 21 calculates the time period from the point at which the pre-charge control is ended to the point at which the shift start time (shift start time) and outputs the calculated time to the starting time operating fluid pressure controlling means 24. The starting time operating fluid pressure controlling means 24 memorizes and holds the calculated shift start time into the memory.

A correcting process of the standby pressure (second correcting process) based on an engine torque related amount being associated with actual engine torque of the vehicle will be explained. The hydraulic pressure controlling device 2 includes an engine rotation number sensor and a standby pressure correcting means (first hydraulic pressure characteristic value correcting means) based on the engine rotation number (not shown). The starting time operating fluid pressure controlling means 24 obtains the correction results from the standby pressure correcting means based on the engine rotation number and executes the standby pressure control by increasing the standby pressure memorized and held in advance, for example, increases at +10% when the engine rotation number is 1000 rpm, increases at +20% when the engine rotation number is 1300 rpm.

On the other hand, once the engagement start detecting means (shift start time period calculating means) 21 determines the shift start, the input rotation change rate calculating means 22 memorizes and holds the input rotation $Nt_1 = Nt_0 - \Delta Nt_1$, actuates the timer for calculating the input rotation change rate, and starts to monitor the input rotation number obtained from the input rotation sensor 13. After the shift start is determined, the starting time operating fluid pressure controlling means 24 increases the hydraulic pressure associated with the plurality of friction engaging elements for starting time 12, transmit input torque into the output side and performs start time shift stages with easing the start time shock. When the input rotation change rate calculating means 22 detects that the rotations is reduced from $Nt_1 = Nt_0 - \Delta Nt_1$ at a predetermined value $\Delta Nt_2$ because of that the input rotation is reduced once the torque is transmitted by the plurality of friction engaging elements for starting time 12, a time $\Delta t$ which is reckoned from the point where the shift start is determined is obtained by the input rotation change rate calculating timer. Then the input rotation change rate is calculated by dividing the predetermined rotation number $\Delta Nt_2$ by the time $\Delta t$, and such rate is output to the starting time operating fluid pressure controlling means 24. The starting time operating fluid pressure controlling means 24 memorizes and holds the calculated input rotation changerate at the memory thereof.

Finally, the engagement end determining means 23 determines the end of the engagement when the input rotation number obtained from the input rotation change rate becomes the value calculated by multiplying the output rotation number by the gear ratio, then the engagement end determining means 23 ends the starting control of the starting time operating fluid pressure controlling means 24.

The starting time operating fluid pressure controlling means 24 executes a learning control based on the shift start time period and the input rotation change rate calculated by the aforementioned starting control as follows. When the shift start time period is not within a range between a predetermined target times, for example a range from 100 ms to 200 ms, the pre-charge time is corrected in accordance with a difference relative to the target time to reflect the corrected value to a next starting control. The corrected pre-charge time is memorized and held in the memory (first correcting process). Further, when the input rotation change rate is not within a range of predetermined target rotation change rates, for example a range from 500 rpm/s to 1500 rpm/s, the standby pressure is corrected in accordance with a difference relative to the target rotation change rate. The corrected standby pressure is memorized and held in the memory (second correcting process).

Each memorized and held hydraulic pressure characteristic value is used at the next starting control to prevent a shift shock and a time-lag expansion depending on the wear of the friction engaging element due to aging and various environments where the automatic transmission is provided. Thus, the shift change has been operated smoothly.

Next, a second embodiment of the present invention will be explained referring to attached drawings. A configuration and operation of the second embodiment is approximately similar to the first embodiment, however, the fist correcting process has priority to be executed in the second embodiment. Thus, only differences between the first embodiment and the second embodiment will be explained hereinbelow.

In the second embodiment, the starting time operating fluid pressure controlling means 24 corrects the pre-charge time based on the shift start time period and memorizes and holds the corrected amount. For example, if the first correcting process is executed when the shift start time period is equal to or more than 200 ms, then the shift start time period becomes equal to or less than 100 ms at the next time starting control, it is determined that the correcting amount is excessive, and the memorized pre-charge time is reduced at the correcting amount. At the same time the second correcting means is executed on and after the next leaning setting until the input rotation change rate is converged within the target range.

Figure 3:
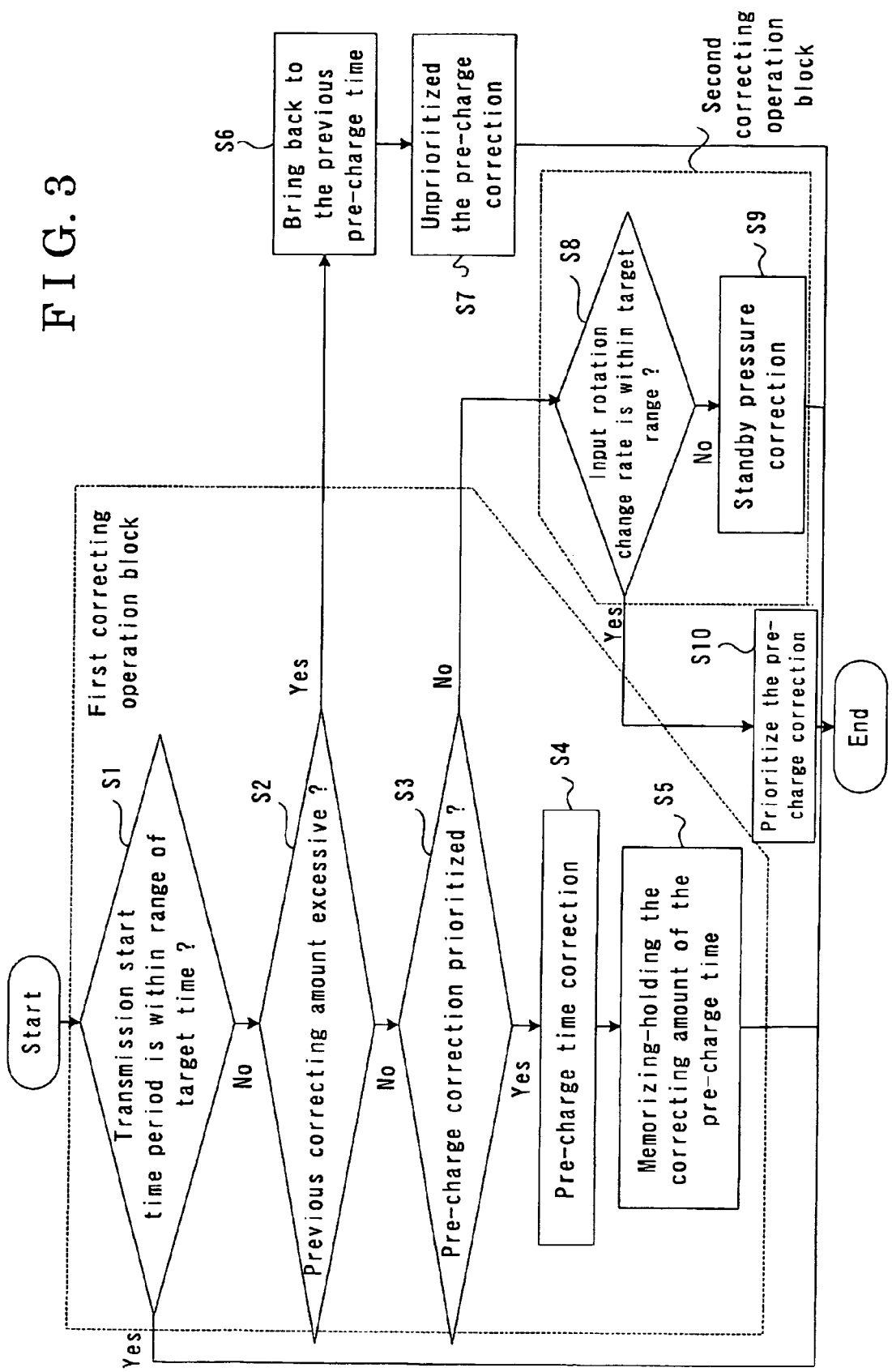
FIG. 3 illustrates a flow chart of a learning process of the hydraulic pressure controlling device of another embodiment of the present invention.

FIG. 3 illustrates a flow chart indicating the leaning behavior by the hydraulic pressure controlling device 2 according to another embodiment of the present invention. In a step S1, the starting time operating fluid pressure controlling means 24 obtains the shift start time period form the engagement start detecting means (shift start time period calculating means) 21 and input rotation change rate from the input rotation change rate calculating means 22. Further, the starting time operating fluid pressure controlling means 24 determines whether or not the obtained shift start time period is within the range of the target shift start time period in a step S1.

When the shift start time period is not within the range of the target shift start time period, the starting time operating fluid pressure controlling means 24 determines whether or not the shift start time period is out of the target start time period due to the previous correcting process in a step S2.

If the starting time operating fluid pressure controlling means 24 determines that it is not due to the previous correcting process, the starting time operating fluid pressure controlling means 24 determines whether or not the pre-charge time correcting process (first correcting process) based on the shift start time period is prioritized in a step S3.

When the pre-charge time correcting process (first correcting process) based on the shift start time period has the priority, the pre-charge time correcting process is executed in accordance with the difference between the target shift start time period and the shift start time period in a step S4.

Then, the correcting amount of the pre-charge time is memorized and held in a step S5.

On the other hand, if the starting time operating fluid pressure controlling means 24 determines in the step S2 that it is due to the previous correcting process, the starting time operating fluid pressure controlling means 24 brings back the pre-charge time in step S6 at the correcting amount memorized and held in the previous step S5. Then, the pre-charge time correction (the first correcting process) based on the shift start time period is unprioritized.

If the starting time operating fluid pressure controlling means 24 determines that the pre-charge time correction (the first correcting process) based on the shift start time period has not a priority in the step S3, the second correcting process on and after a step S8 is executed.

The starting time operating fluid pressure controlling means 24 determines whether or not the input rotation change rate is within the range of the target input rotation change rate in the step S8.

If the input rotation change rate is not within the range of the target input rotation change rate, the standby pressure is corrected in response to the difference between the target input rotation change rate and the input rotation change rate in a step S9.

On and after the next leaning process, the standby pressure correction (the second correcting process) based on the input rotation change rate is continued as long as the shift start time period is out of the range of the target shift start time period, and the pre-charge time correction (the first correcting process) based on the shift start time period has not a priority.

Then, the input rotation change rate becomes within the range of the target input rotation change rate, the pre-charge time correction (the first correcting process) based on the shift start time is prioritized in a step S10.

Figure 4:
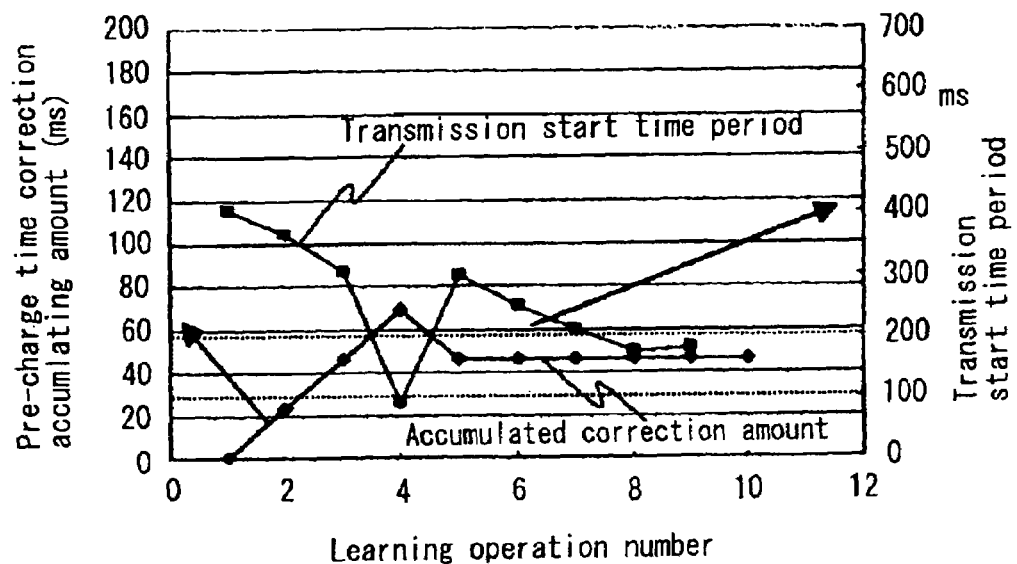
FIG. 4 illustrates a graph indicating convergence of another embodiment of the present invention.
Figure 5:
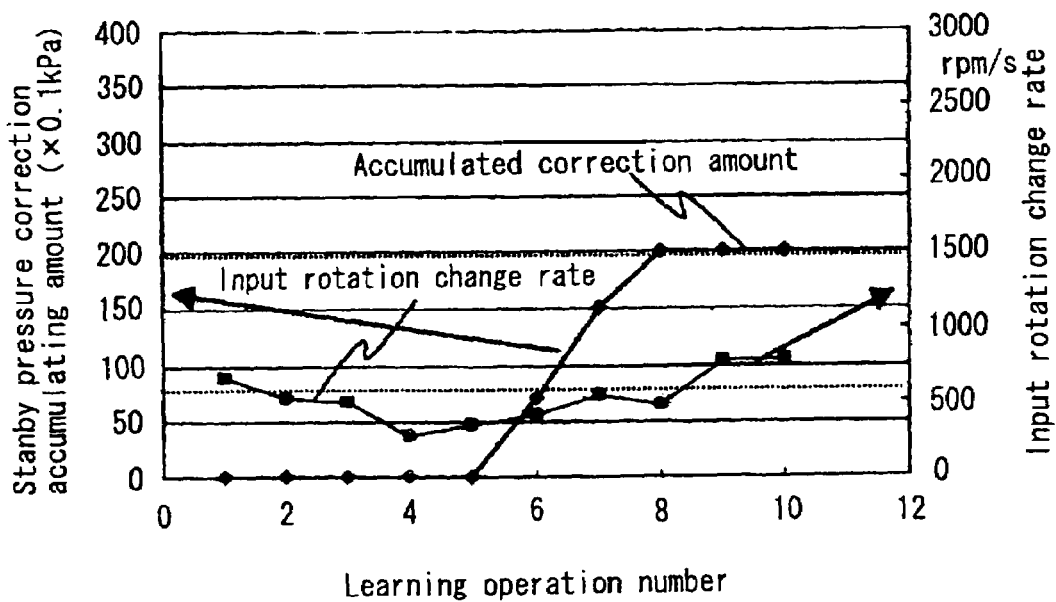
FIG. 5 illustrates a graph indicating convergence of another embodiment of the present invention.
Figure 6A:
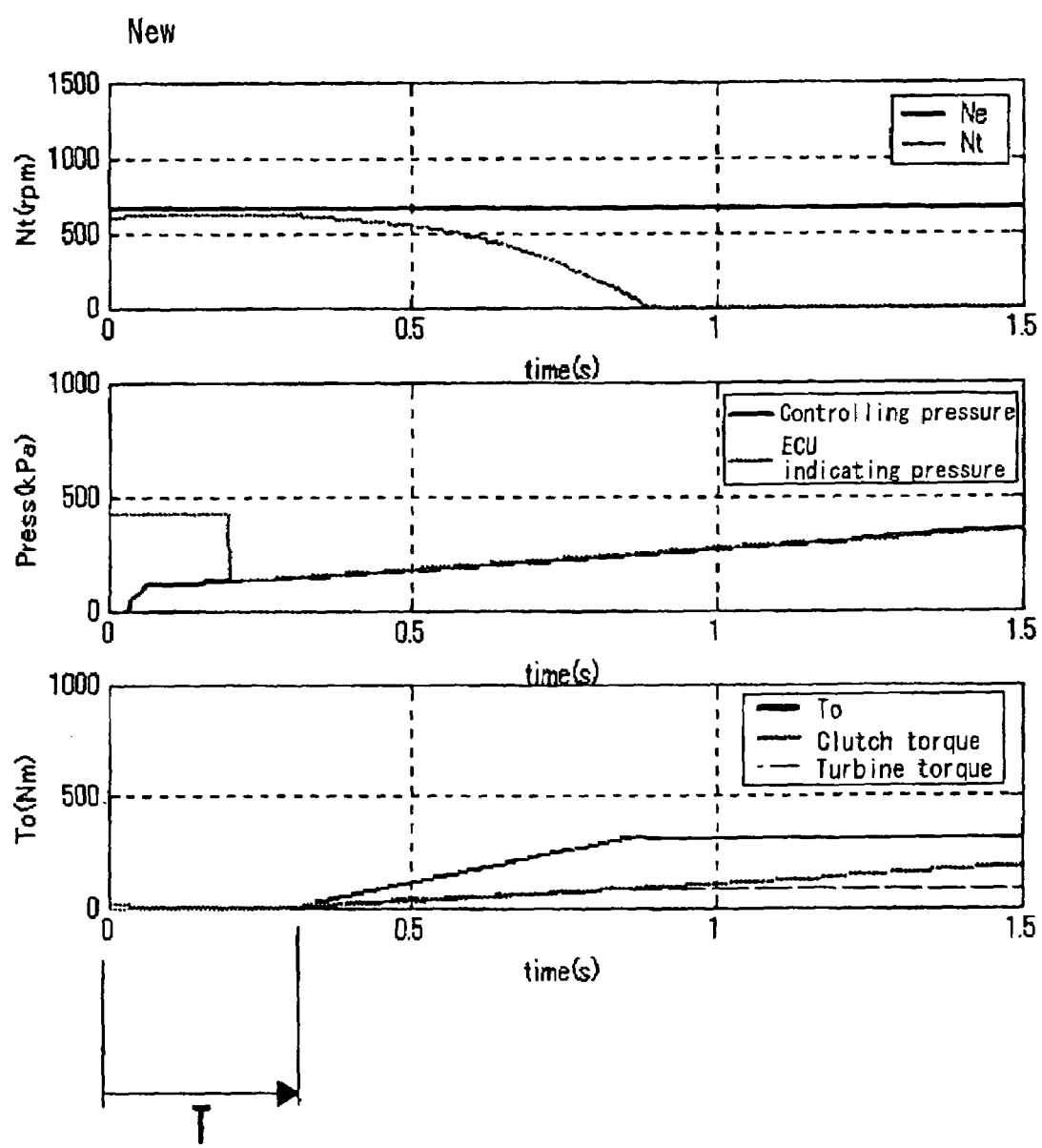
FIG. 6A illustrates graphs indicating result of a starting control of a new friction engaging element C1 for starting control on a like-for-like basis.
Figure 6:
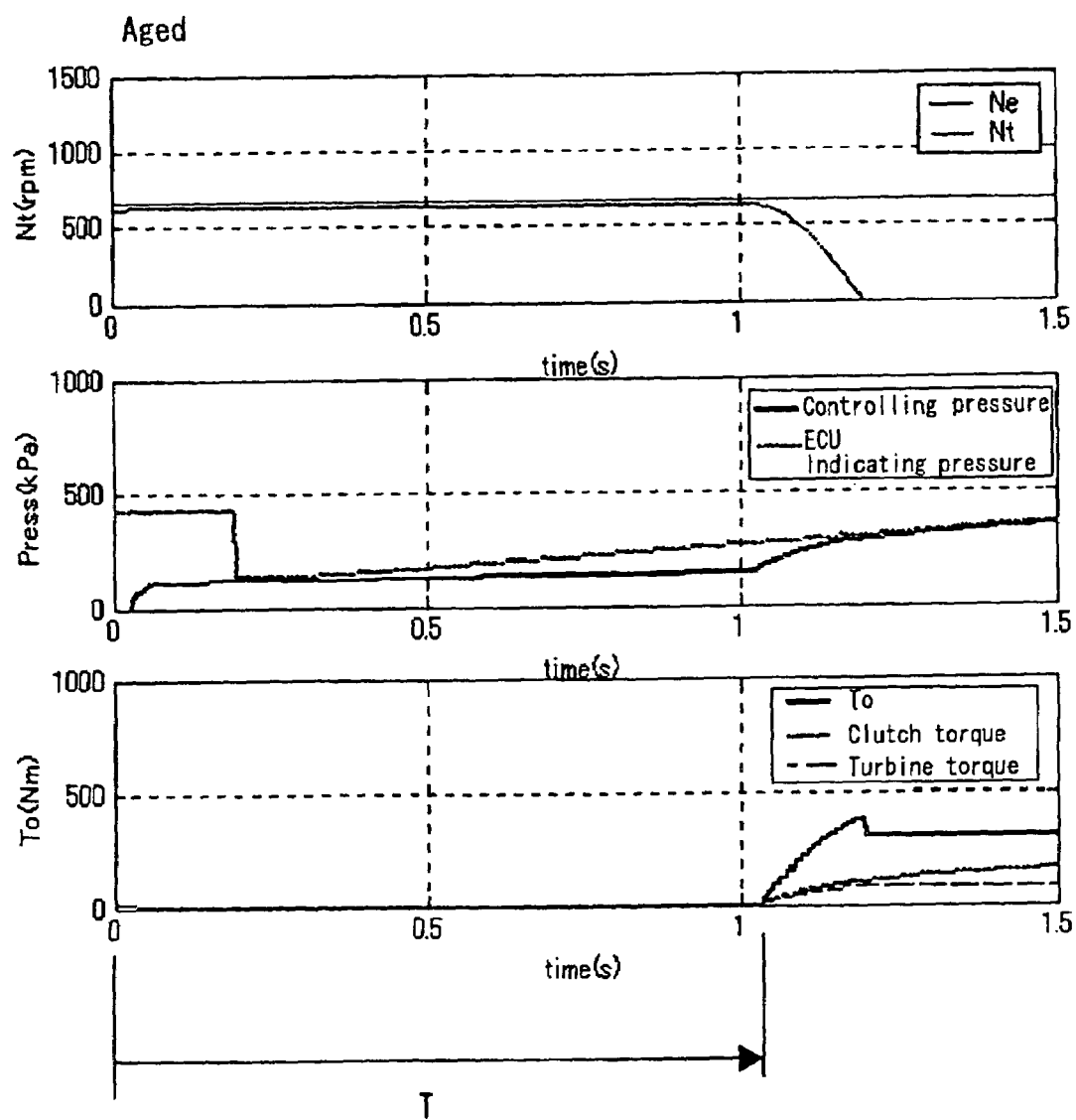
FIG. 6B illustrates graphs indicating result of a starting control of a aged friction engaging element C1 (0.4 mm/pirce) for starting control on a like-for-like basis.

FIG. 4 and FIG. 5 illustrated graphs indicating results of the repeated aforementioned leaning flow. In FIG. 4, the shift start time periods and accumulated correction amounts of the pre-charge time based on the shift start time period are plotted per each learning process. In FIG. 4, an upper dashed-line indicates an upper limit of the target shift start time period, and the lower dashed-line indicates a lower limit of the target shift start time period. In FIG. 5, the input rotation change rate obtained in the second correcting process which is executed supplementary relative to the first correcting process and an accumulated correction amount of the standby pressure based on the input rotation change rate. In FIG. 5, an upper dashed-line indicates an upper limit of the target input rotation number change rate, and the lower dashed-line indicates a lower limit of the target input rotation number change rate.

As shown in FIG. 4, in the first leaning process, the shift start time period is about 400 ms and far exceed relative to the target shift start time period, so that the pre-charge time is increased at 23 ms to be reflected to the second correction accumulated amount In the second leaning process, the starting control is executed by reflecting the pre-charge correction in first leaning process, and the shift start time period is reduced by about 360 ms. Such reduced shift start time period is still far exceed relative to the target shift start time period, so that the pre-charge time is increased at 23 ms to be reflected to the third correction accumulated amount and becomes 46 ms.

In the third leaning process, the starting control is executed by reflecting the pre-charge correction in second leaning process, and the shift start time period is reduced by about 310 ms. Such reduced shift start time period is still far exceed relative to the target shift start time, so that the pre-charge time is increased at 23 ms to be reflected to the fourth correction accumulated amount and becomes 69 ms.

In the fourth leaning process, the starting control is executed by reflecting the pre-charge correction in third leaning process, and the shift start time period is rapidly reduced by about 90 ms, so that pre-charge time is brought back at 23 ms to be reflected to the fifth correction accumulate amount.

During a period in which the aforementioned correcting processes are executed, the first correcting process is executed preferentially, so that the second correcting process is not executed. In the fifth leaning process, the second correcting process is executed preferentially if the shift start time period is out of the range of the target shift start time period.

The input rotation change rate is 400 rpm/s and out of the range of the target input rotation change rate, so that the standby pressure is increased at 7.5 kPa (75×0.1 kPa) to be reflected to the sixth correction accumulated amount.

In the sixth leaning process, the starting control is executed by reflecting the pre-charge correction in the fifth leaning process, and the input rotation change rate is slightly increased by about 450 rpm/s. Such increased input rotation change rate is still below the target input rotation change rate, so that the standby pressure is increased at 7.5 kPa (75×0.1 kPa) to be reflected to the seventh correction accumulated amount.

In the seventh leaning process, the starting control is executed by reflecting the pre-charge correction in sixth leaning process. The input rotation change rate is slightly below the target input rotation change rate, so that the standby pressure is increased at 5 kPa (50×0.1 kPa) to be reflected to the eighth correction accumulated amount.

As shown in FIG. 4, after the second correcting process, the shift start time period is converged within the range of the target shift start time period, so that the first and second correcting process are not executed in the eighth learning process.

According to the second embodiment of the present invention, hunting of the correcting amount of the plural elements such as the pre-charge time and the standby pressure to be converged to the each target value can be eliminated. Thus, the shift change has been operated smoothly, and such smooth operation can be easily maintained. Either one of the first correcting operation or the second correcting operation can be is prioritized. The converging performance can be improved by preferably setting each correcting amount.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the sprit of the present invention. Accordingly, it is expressly intended that all such variations, changes and equivalents which fall within the spirit and scope of the present invention as defined in the claims, be embraced thereby.

The invention claimed is:

1. A hydraulic pressure controlling device for an automatic transmission controlling a plurality of friction engaging elements to be engaged and disengaged by controlling a hydraulic pressure provided from the hydraulic pressure controlling device for forming a plurality of shift stages by combination of the engagement and the disengagement of the friction engaging elements, comprising;
   a shift lever operation detecting means;
   an input rotation detecting means for monitoring an input shaft rotation number;
   a shift start time period calculating means for judging that an engagement of each friction engaging element is started when the input shaft rotation number is decreased at a predetermined rotation number and calculating a shift start time period from a predetermined shift start determining reference time to a time when the engagement is started;
   an input rotation change rate detecting means for calculating an input shaft rotation change rate when the input shaft rotation number is decreased by a predetermined rotation number after the engagement is started;
   a first correcting means for correcting a pre-charge time when the shift start time period calculated by the shift start time period calculating means is not within a predetermined target area depending on a difference between the target area and the shift start time period, and learning-setting the corrected amount, and
   a second correcting means for correcting a standby pressure when the input rotation change rate calculated by the input rotation change rate detecting means is not within a predetermined target area depending on a difference between the target area and the input rotation change rate, and learning-setting the corrected amount.

2. A hydraulic pressure controlling device for an automatic transmission according to claim 1, wherein a first hydraulic pressure characteristic value correcting means is provided for correcting a hydraulic pressure characteristic value based on an engine torque related amount related to an actual engine torque of a vehicle.

3. A hydraulic pressure controlling device for an automatic transmission according to claim 1, wherein an operating fluid temperature detecting means for detecting a temperature of an operating fluid in the hydraulic pressure controlling device and a second hydraulic pressure characteristic value correcting means for correcting a hydraulic pressure characteristic value based on the detected operating fluid temperature are provided.

* * * * *